United States Patent

[11] 3,599,112

| [72] | Inventor | Eberhard Holtz<br>Aachen, Germany |
|---|---|---|
| [21] | Appl. No. | 23,414 |
| [22] | Filed | Mar. 27, 1970 |
| [45] | Patented | Aug. 10, 1971 |
| [73] | Assignee | Carl Zeiss-Stiftung<br>Heidenheim on the Brenz, Wuerttemberg, Germany |
| [32] | Priority | Mar. 28, 1969 |
| [33] | | Germany |
| [31] | | P 19 15 890.8 |

[54] LASER HAVING A TELESCOPIC SYSTEM RELATED TO THE OUTPUT REFLECTOR TO KEEP THE DIRECTION OF THE OUTPUT BEAM CONSTANT
7 Claims, 3 Drawing Figs.

[52] U.S. Cl. .................................. 331/94.5, 350/8
[51] Int. Cl. .................................. H01s 3/00
[50] Field of Search .......................... 331/94.5; 350/8, 319

[56] References Cited
UNITED STATES PATENTS

| 3,200,697 | 8/1965 | Goubau | 350/96 |
| 3,258,717 | 6/1966 | Katzman | 331/94.5 |
| 3,369,192 | 2/1968 | Koester | 331/94.5 |
| 3,392,261 | 7/1968 | Schollhammer | 319/121 |
| 3,410,641 | 11/1968 | Bergman | 418/268 |
| 3,473,030 | 10/1969 | Mevers et al. | 350/99 |
| 3,492,072 | 1/1970 | Haan, Jr. | 355/78 |
| 3,513,402 | 5/1970 | Morrison | 330/4.3 |
| 3,533,700 | 10/1970 | Alexander | 356/178 |

Primary Examiner—Ronald L. Wibert
Assistant Examiner—Edward S. Bauer
Attorney—Sandoe, Hopgood and Calimafde ABSTRACT: Apparatus for generating a laser beam in a constant spatial direction by a laser tube between a spherical resonator reflector and a spherical semipermeable tune-out reflector, includes a telescopic system, consisting of an objective lens and an ocular lens, rigidly mounted in optical axial alignment with the tune-out reflector. The focal point of the combination of the tune-out reflector and telescopic system coincides with center of curvature of the front surface of the tune-out reflector. In a preferred form the radius of curvature of the surface of the output side of the tune-out reflector is in accordance with the formula $R_3=(R_1+d)\times 1-7/n$, $R_1$ being the radius of the front surface, $d$ the thickness at the axis and $n$ the index of refraction of the tune-out reflector. In one form a horizontalizing compensator is included between the ocular and objective lens of the telescopic system. Preferably the tune-out reflector and the telescopic system and the resonator reflector and the laser tube are mounted in operative relation so as to be thermally separated. The telescopic system is preferably afocal.

LASER HAVING A TELESCOPIC SYSTEM RELATED TO THE OUTPUT REFLECTOR TO KEEP THE DIRECTION OF THE OUTPUT BEAM CONSTANT

The present invention is apparatus for generating a laser beam that is spatially constant.

The laser beam is produced in a laser generator, which contains a suitable medium (a gas, a liquid or solid), mounted between two reflectors, a spherical resonator reflector and a spherical, semipermeable tune-out (output) reflector. The beam generated runs inside the resonator formed by the reflectors through their centers of curvature and out through the tune-out reflector.

Some optical measuring processes employ a laser beam as a tool. For example, a laser beam may serve to transfer the coordinates of one point to another point, as in surveying. In such measuring processes it is necessary that the spatial direction of the laser beam remain constant during the measuring operation.

It is common usage for measuring purposes to send the laser beam which exits from the resonator through the tune-out reflector, out through a telescopic optical system, which serves to reduce the beam aperture angle. The spatial position of the laser beam thus does not depend solely upon the position of the two laser reflectors, it is also determined by the relative positions of the optical system and the laser generator.

Experience teaches that, in equipment of the type described above, the laser beam changes its spatial position during operation due to changes in temperature, in bearing forces and in bearing moments.

It is an object of the present invention to provide apparatus of the type described in which the spatial direction of the laser beam remains constant during the measuring operation, which is particularly important for measuring purposes.

In accordance with this invention, the tune-out reflector of the laser generator is rigidly attached to the optical system, with their optical axis aligned and with the focal point of the combined system formed by the tune-out reflector and the telescopic optical system coinciding with the center of curvature of the front surface of the tune-out reflector.

The telescopic optical system, which includes an objective lens and an ocular lens, for reducing the beam aperture angle, is advantageously an afocal telescope, or the ocular lens may be movable axially to set the telescope at infinity.

Inside the resonator of the laser generator limited by the two reflectors the axis of the beam generated forms a straight line through the center of curvature of the front (opposing) surfaces of the two reflectors. If for some reason the resonator reflector opposite the tune-out reflector is thrown out of alignment, the axis of the beam continues to pass through the center of curvature of the front surface of the tune-out reflector. Since, in accordance with the invention the center of curvature of the tune-out reflector coincides with the focal point of the combined system formed by the tune-out reflector and the telescope, the axis of the laser beam exiting from the telescope is always parallel to the optical axis of the telescope. Thus, when resonator reflector is out of alignment there will not be any inclination of the laser beam relative to the axis of the telescope, but the axis of the beam will shift parallel to its original alignment, the degree of shifting depending upon the degree of misalignment of the resonator reflector. This parallel shift in any event is very small, being in the order of 1 to 3 mm. Since the beam deviation is caused mainly by a beam inclination and less by a parallel beam shifting where long measuring distances are involved, the apparatus of the present invention is adapted to correct for angular deviations of the components, which cause angular deviation of the beam in previously known apparatus, by causing them to shift the beam in a parallel direction.

It is also particularly advantageous in apparatus of this invention to have the surface of the tune-out reflector, at its output side curved to a radius $R_3$ determined by the formula $R_3 = (R_1 + d) \times (1 - 1/n)$, in which $R_1$ is the radius of the inner surface of the tune-out reflector, $d$ is its thickness through its axis and $n$ is its index of refraction. With this curvature, the beam exiting from the laser generator will always remain parallel to the optical axis of the tune-out reflector, even when the other resonator reflector becomes misaligned. Since the tune-out reflector and the telescopic optical system are rigidly connected in axial alignment, the beam leaving the optical system will therefore leave parallel to the axis of the latter system.

It is also particularly advantageous to employ a telescopic optical system incorporating a conventional compensator for automatically horizontalizing the laser beam target line so that the axis of the laser beam will be made horizontal when the telescope axis is inclined within the effective range of the compensator. In order to prevent heat generated by the laser tube of the laser generating system from causing misalignment of the beam guiding system, comprising the tune-out reflector and the telescopic optical system, the latter elements are preferably thermally separated from the laser tube, for example by utilizing a common support which is a poor heat conductor.

The invention is described below in greater detail with respect to the illustrative embodiment shown in the accompanying drawing in which.

Figure 1:
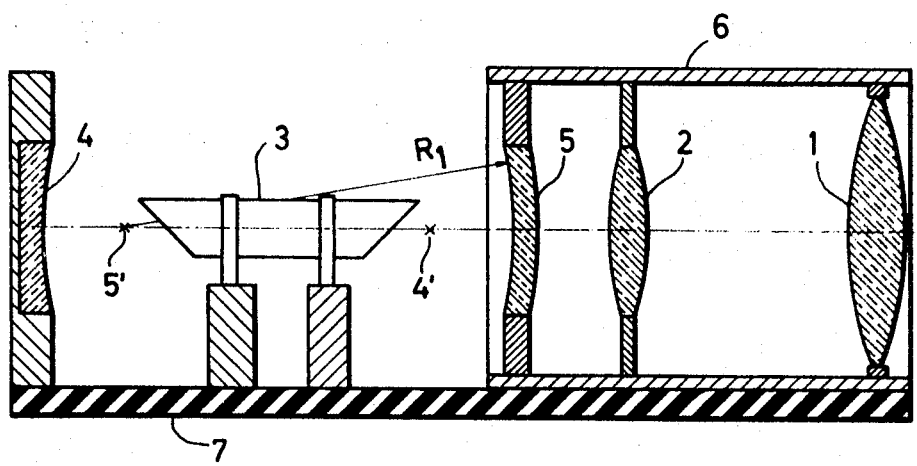
FIG. 1 is a longitudinal cross-sectional view of apparatus of this invention, showing the laser tube in side elevation.

In the laser beam generating apparatus of this invention as illustrated in FIG. 1 the telescopic optical system is formed by an objective lens 1 and an ocular lens 2, which is suitably axially movable. The telescope provided by the lenses 1 and 2 is preferably an afocal telescope.

The laser generator consists of a laser tube 3, containing a suitable laser medium, such as a gas, mounted between a spherical tune-out (output) reflector 5 and a spherical resonator reflector 4.

The tune-out reflector 5 is rigidly connected in axial alignment with the telescopic optical system by being mounted in a housing 6 with the lenses 1 and 2 comprising the telescope.

Designating the focal lengths of the two lenses 1 and 2 of the telescope $f_1$ and $f_2$, the telescope reduces the aperture angle of the laser beam exiting from the tune-out reflector 5 in the ratio $f_1 / f_2$ so that the beam has as uniform a diameter as possible at any distance from the apparatus.

After selecting a desired aperture angle of the laser beam by selection of lenses 1 and 2 of the telescope, the ocular lens 2 is moved axially so that the focal point of the combined system, formed by the tune-out reflector 5 and lenses 1 and 2, coincides with the center of curvature 5' of the front surface of the tune-out reflector 5. The radius of the curvature of the reflector surface is designated $R_1$. Generally, the setting of the telescope thus obtained does not correspond to the setting for "infinity."

The axis of the laser tube 3 is aligned with the telescope axis, and the configuration of laser generator and telescope is such that the beam axis of the laser generator, going through the straight line connecting the two centers of curvature centers 4' and 5', of the reflectors 4 and 5, coincides with the optical axis of the telescope.

The lenses 1 and 2, and the comparable lenses forming the telescopic optical system in the embodiments subsequently described with reference to FIGS. 2 and 3, have aperture diameters that are large enough not to mask the beam while serving to reduce the beam aperture angle. The telescopic optical systems need only to be corrected spherically; color correction or correction for other reproduction errors are not necessary, so that a rather simply and inexpensively constructed telescopic optical system may be utilized in the apparatus of this invention.

The laser tube 3 and the reflector 4 are preferably mounted on a common support 7 made of a poor heat-conducting material so that the beam-guiding system formed by the telescope lenses 1, 2 and the tune-out reflector 5 is thermally separated from the beam-generating system consisting of the laser tube 3 and the resonator reflector 4.

If the resonator reflector 4 of the apparatus shown in FIG. 1 becomes misaligned, the beam axis continues to go through the curvature center 5' of the tune-out reflector 5. Since the curvature center 5' coincides with the focal point of the beam-guiding system (lenses 1 and 2 and tune-out reflector 5) the axis of the exiting laser beam is always parallel to the optical axis of the telescope. However, a misalignment of the resonator reflector 4 produces a parallel shifting of the exiting beam.

Figure 2:
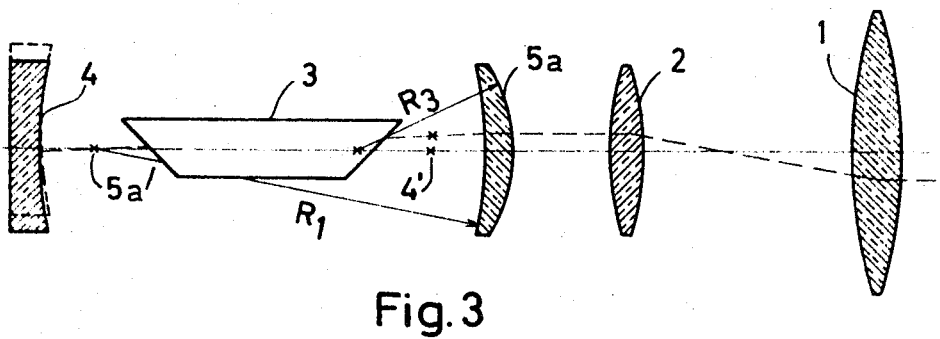
FIG. 2 is a diagrammatic longitudinal cross-sectional view similar to the view of FIG. 1, but showing a preferred form of the tune-out reflector.

Referring to FIG. 2, the surface of the output side of the tune-out reflector 5a of the apparatus illustrated is preferably curved about a radius $R_3$ determined by the formula $R_3=(R_1+d)\times(1-1/n)$, previously explained. The focal point of the combined system, consisting of lenses 1 and 2 and the tune-out reflector 5a coincides with the center of curvature 5a' of the front surface of the tune-out reflector 5a. The ocular lens 2, simultaneously is in such an axial attitude that the focal points of the lenses 1 and 2 coincide, which corresponds to the telescope being set at "infinity."

With this construction of the tune-out reflector 5a the beam exiting from the laser generator is always parallel to the optical axis of the tune-out reflector 5a, even when the resonator reflector 4 is out of center. Since the optical axis of reflector 5a coincides with the optical axis of the telescope, which is either set to infinity or is afocal, the axis of the exiting laser beam is always parallel to the optical axis of the lenses 1 and 2 forming the telescope.

An out-of-center misalignment of the resonator reflector 4 is shown in FIG. 2 by dashed lines. As indicated, this causes no inclination of the exiting laser beam which is shown, in dashed lines, rather, the beam is merely shifted parallel to the optical axis of the telescope lenses 1, 2. However, misalignments of the resonator reflector 4 that are correctable by the apparatus are limited by the geometry of the laser tube 3 and the laser oscillations will stop when these limits are exceeded. The same applies to misalignment of the laser tube 3.

If the geometry of the resonator reflector 4 is changed, due to heating, for example, then only the output, but not the direction, of the exiting beam is affected by the misalignment where a tune-out reflector 5a dimensioned as described above is utilized.

Figure 3:
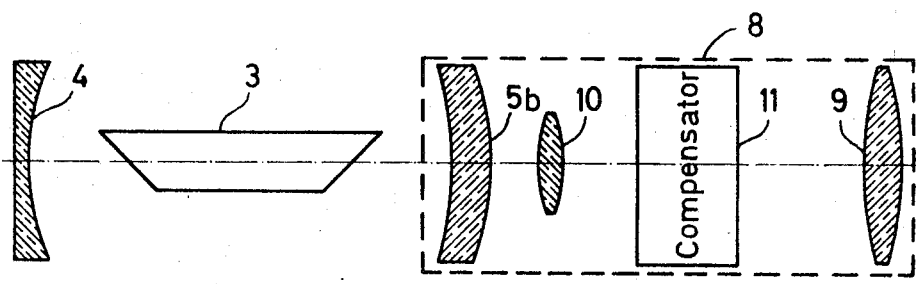
FIG. 3 is a diagrammatic longitudinal cross section view illustrating a further modification in which the telescopic optical system includes a conventional compensator for horizontalizing the laser beam target line.

FIG. 3 shows an embodiment in which the beam-guiding system constituted by a tune-out reflector 5b and a telescope formed by an objective lens 9 and an ocular lens 10 includes a compensator 11 mounted between the lens 9 and 10 for automatically horizontalizing the target line (i.e., the optical axis of the beam-guiding system). As in the embodiments shown in FIGS. 1 and 2, the beam-guiding system of this FIG. 3 embodiment is rigidly joined to the beam generating system—constituted by the laser tube 3 and the resonator reflector 4—in axial alignment therewith by suitable means such as a common support illustrated by the support 7 in FIG. 1 which is also preferably of a poor heat-conducting material.

It has been found that the beam-guiding system shown in FIG. 3 may be provided by a commercial levelling instrument 8—designated by the dash line enclosure around the lenses 5b, 9 and 10 and the compensator 11, which form this beam-guiding system—by selecting a levelling instrument 8 in which its focal point coincides with the center of curvature of the front surface of the tune-out reflector lens 5b and which the objective lens 9 and ocular lens 10 (forming an afocal telescope or being set to infinity) are selected to produce the optimum beam aperture angle desired.

With this embodiment, as long as any inclination of the levelling instrument 8 is within the effective range of deviation from the horizontal that are compensated for by the compensator 11, the apparatus generates a horizontal laser beam regardless of such inclination of the levelling instrument.

What I claim is:

1. Apparatus for generating a laser beam wherein the apparatus includes a laser tube disposed between a spherical resonator reflector and a spherical semipermeable tune-out reflector and a telescopic optical system comprising an ocular lens and an objective lens disposed at the output side of the tune-out reflector characterized in that the tune-out reflector is rigidly connected in optical axial alignment with the telescopic optical system and that the focal point of the system formed the tune-out reflector and the telescopic system coincides with the center of curvature of the front, inwardly facing, surface of the tune-out reflector.

2. The apparatus of claim 1 in which the telescopic optical system is an afocal telescope that reduces the beam aperture angle.

3. The apparatus of claim 1 in which the surface of the output side of said tune-out reflector is curved to a radius $R_3$ in accordance with the formula $R_3=(R_1+d)\times(1-1/n)$ in which $R_1$ is the radius of the front surface of said reflector, $d$ is its thickness through its optical axis, and $n$ is its index of refraction.

4. The apparatus of claim 1 in which the telescope optical system incorporates a conventional compensator mounted between the objective and ocular lenses for horizontalizing the optical axis through the tune-out reflector and the telescopic optical system.

5. The apparatus of claim 1 in which the ocular lens of the telescopic optical system is movable axially to adjust the beam aperture angle.

6. The apparatus of claim 1 in which the tune-out reflector and the telescopic optical system are mounted in operative alignment with the laser tube and the resonator reflector by poor heat conducting means.

7. The apparatus of claim 1 in which the tune-out reflector and telescopic optical system are mounted in operative alignment on a common support member that is a poor heat conductor.